Feb. 28, 1967     G. C. THRONER, JR     3,306,204
ROCKET PROJECTILE WITH SUPPORTED PROPELLANT GRAIN
Filed Oct. 5, 1962     5 Sheets-Sheet 1
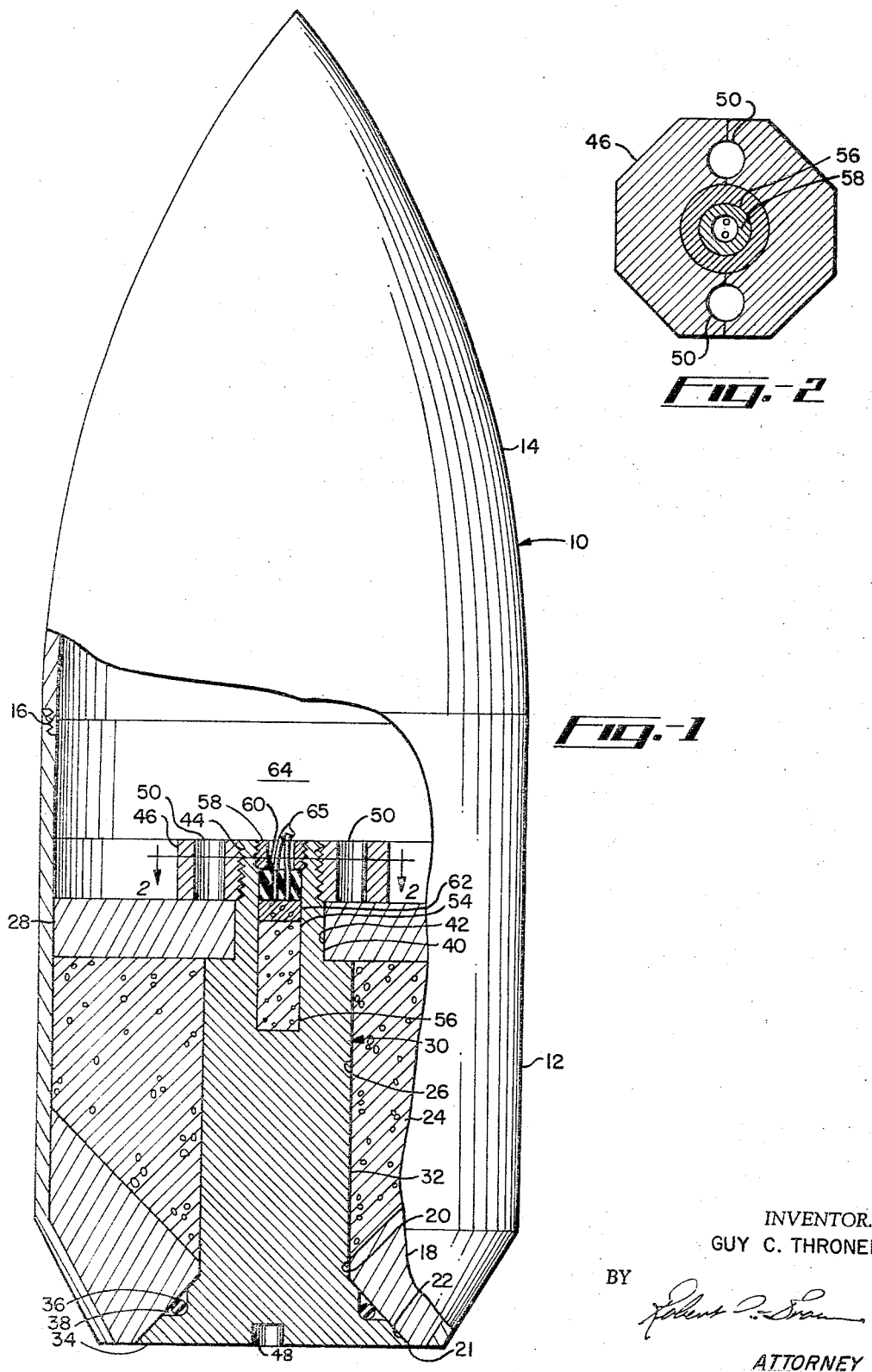
INVENTOR.
GUY C. THRONER, JR.
BY
ATTORNEY INVENTOR.
GUY C. THRONER, Jr Feb. 28, 1967  G. C. THRONER, JR  3,306,204
ROCKET PROJECTILE WITH SUPPORTED PROPELLANT GRAIN
Filed Oct. 5, 1962  5 Sheets-Sheet 3

INVENTOR.
GUY C. THRONER, JR
BY
ATTORNEY

Feb. 28, 1967 G. C. THRONER, JR 3,306,204
ROCKET PROJECTILE WITH SUPPORTED PROPELLANT GRAIN
Filed Oct. 5, 1962 5 Sheets-Sheet 5

INVENTOR.
GUY C. THRONER, JR.
BY Robert C. Braun
ATTORNEY

United States Patent Office 3,306,204
Patented Feb. 28, 1967

3,306,204
ROCKET PROJECTILE WITH SUPPORTED PROPELLANT GRAIN
Guy C. Throner, Jr., Glendora, Calif., assignor to Aerojet-General Corporation, Azusa, Calif., a corporation of Ohio
Filed Oct. 5, 1962, Ser. No. 228,603
15 Claims. (Cl. 102—49)

This invention relates generally to a rocket projectile and, in particular, to a rocket projectile adapted to be launched by a suitable launching device such as a gun, mortar, or launcher tube.

The typical rocket projectile now in use has the disadvantage that the rocket propellant grain in the projectile tends to deform and/or be extruded from the projectile due to the high acceleration forces experienced by the projectile when it is launched from a gun, mortar, or launcher tube. This results in a lack of uniform burning of the propellant grain and, occasionally, failure of the entire rocket projectile. Also, it is possible in the presently used rocket projectiles that the propellant grain therein might be prematurely ignited by the propelling charge in the launching device.

It is therefore the principal object of the present invention to overcome the above-mentioned disadvantages by providing a means for supporting the rocket propellant grain and closing the nozzle of a rocket projectile during launching to prevent the propellant grain of the projectile from deforming or being extruded from the rear of the projectile. An additional object of the invention is to provide means for preventing the rocket propellant of a projectile from being prematurely ignited by the propelling charge.

In its principal aspect, the present invention comprises a rocket chamber having a bulkhead at the front end thereof and shaped at its rear portion to provide a converging-diverging nozzle section. A warhead may be affixed to the rocket chamber forward of the bulkhead. A propellant grain having a cavity therein is located in the rocket chamber between the nozzle section and bulkhead. A principal feature of the present invention is to provide in the cavity area of the propellant grain a plug which completely fills the cavity and thereby supports the propellant grain. The plug is attached to the bulkhead and means are provided for separating the plug from the bulkhead and ejecting the plug from the rear of the rocket chamber after the projectile has been launched from a gun, mortar, or launcher tube, which will be referred to throughout the specification and claims as a suitable launching device. Another feature of the present invention is the provision of means for igniting the propellant grain after the plug is ejected from the projectile. Once the plug is ejected from the rocket chamber and the propellant grain is ignited, the projectile proceeds on its course operating as a normal rocket motor.

Other objects, aspects, and advantages will become apparent from the following description in connection with the accompanying drawings, wherein:

FIGURE 1 is a partial longitudinal section of a rocket projectile embodying the novel features of the present invention;

FIGURE 2 is a cross-section taken on line 2—2 of FIGURE 1;

Figure 3:
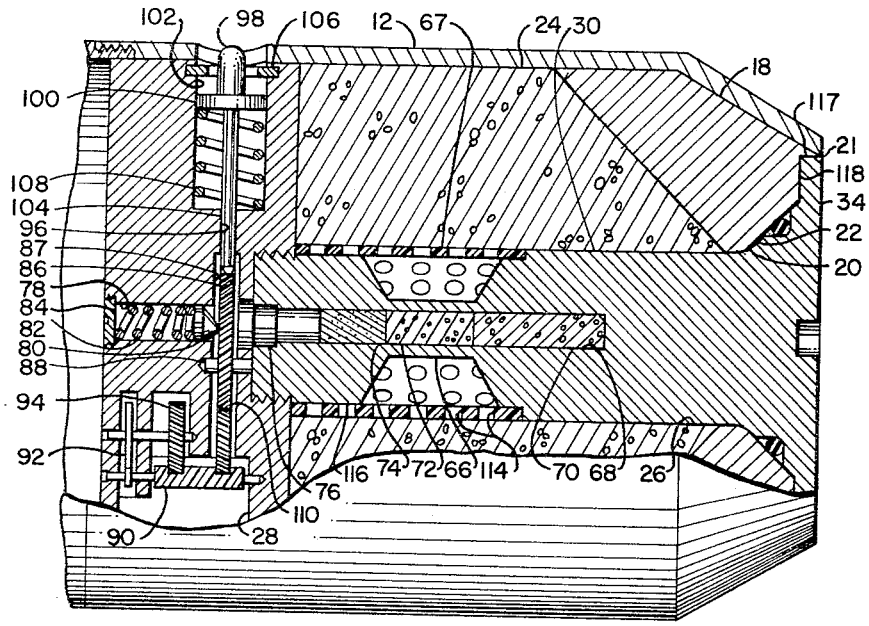
FIGURE 3 is a partial longitudinal section of the rear portion of an embodiment of the rocket projectile.

Referring now to the drawings wherein like reference characters designate like or corresponding parts throughout the various views, there is shown in FIGURES 1 and 2 one embodiment of the present invention.

The rocket projectile, generally designated by numeral 10, includes a rocket chamber 12 and a warhead 14 mounted on the forward portion thereof. The warhead 14 may be screw threaded to the rocket chamber 12 as indicated at 16. The warhead may be of any suitable type and forms no part of the present invention. Fixed by any suitable means such as welding to the rear of the rocket chamber 12 is a ring 18 which is shaped to provide a converging-diverging nozzle section 22 having a throat 20 and a discharge orifice 21. Propellant grain, indicated at 24, having a central cavity 26 is positioned between the ring 18 and a forward motor bulkhead 28 which is located forward of the propellant grain and at the front of the rocket chamber 12. It can be appreciated that the projectile described so far is of the common type which may be launched by any suitable launching device which employs a propellant charge for launching the projectile therefrom.

As mentioned above, the typical rocket projectile has the disadvantage that the nozzle throat 20 and cavity 26 are normally open so that hot gases from the launcher propelling charge may leak into the rocket chamber 12 tending to prematurely ignite the grain therein, and also the grain will tend to deform or be extruded from the projectile when subjected to high axial acceleration forces on being launched.

The novel feature of the present invention is to provide a means for supporting the propellant grain 24 in rocket chamber 12 and preventing gases from a launcher device from entering the rear of the rocket chamber, which means generally comprise a plug indicated by numeral 30. The plug 30 may be formed of any suitable metal, rubber or nonbrittle plastic and includes a main body portion 32 which completely fills the cavity 26 of the propellant grain and thereby supports the grain and prevents it from being deformed or extruded during launching of the projectile. The plug also is provided with a head portion 34 which fills the diverging portion of nozzle section 22 of the projectile. It can be seen by this arrangement that means are provided for filling or plugging the diverging portion of nozzle section 22, the throat 20 and cavity 26 of the propellant grain 24. A sealing ring 36, which may be either a resilient O-ring or may be formed of lead or any other suitable sealing material, is positioned in a groove 38 formed in the diverging portion of plug 30. This seal prevents the gases from the launching device from leaking into the rocket chamber.

The plug 30 in FIGURE 1 has a reduced diameter boss 40 which extends through an opening 42 in the motor bulkhead 28 and is threaded at 44 for receiving an explosive nut 46. A slot 48 is provided in the head portion of the plug 30 so that the plug may be held stationary while the explosive nut 46 is threaded on the boss 40 whereby the plug is connected to the forward bulkhead. The explosive nut 46 is of the type well-known in the art wherein a single or plurality of detonators 50 may be positioned in one or opposing sides of the nut, there being two of such detonators shown in FIGURE 2. It can be appreciated that when the detonators 50 are initiated, the nut will be fractured, thus causing the nut to separate from the threaded portion of the boss 40 and permitting the plug to be subsequently released from the bulkhead 28.

A propellant grain ignition charge 54 is positioned in a longitudinal bore 56 in the forward portion of the plug 30. A hollow plug 58 in the end of the bore 56 retains a gas seal 60 against a primer 62 for the ignition charge 54. The primer 62 and the two detonators 50 of the explosive nut 46 may be initiated at any predetermined time after the projectile has been launched from a launcher device by any suitable electrical timing mechanism shown schematically at 64. The electrical timing mechanism 64 may be a simple R-C timer circuit, which is well-known in the art, and an inertia switch, not shown, may be employed to energize the R-C circuit when the projectile is subjected to acceleration forces when launched from a launcher tube. The resistance and capacitance of the R-C timer may be calibrated to fire the primer and detonator at the desired time, since it is known by experience the time required for the projectile to be projected from the end of a launcher device. In general, it is preferable that the timer 64 be set so that the detonator will be initiated when the projectile is at the peak of its trajectory. Hence, when the projectile is fired from a launcher, the electrical timing mechanism 64 will energize the primer 62 through leads 65 and the detonators 50 of the explosive nut 46 through leads, not shown. Firing detonators 50 will cause the explosive nut to be fractured, permitting the plug 30 to be separated from the bulkhead 28, and energizing the primer 62 will ignite the propellant ignition charge 54. Firing of the ignition charge will create sufficient force to cause the plug 30 to be ejected from the rear of the rocket chamber 12. The charge 54 should also contain sufficient thermal energy to ignite the propellant grain 24 in the rocket chamber as the plug is ejected therefrom. It can be appreciated that upon ignition of the propellant grain 24 an additional pressure will be created to assist the ejection of the plug 30 from the rocket chamber.

The embodiment of the invention shown in FIGURE 3 is similar to that shown in FIGURES 1 and 2, but differs in that a mechanical means is provided for causing the separation of the plug 30 and ignition of the propellant grain 24. The plug 30 is directly screw-threaded into the motor bulkhead 28 and has a reduced diameter portion 66 between the throat 20 and the bulkhead 28. A sleeve 67, which will be described more fully later, surrounds portion 66 so that a continuous support is provided for the propellant grain 24. A longitudinal bore 68 extends through the forward portion of the plug 30 and contains a propellant grain ignition charge 70, an explosive charge or detonator 72 lying adjacent to the reduced diameter portion 66, and a pyrotechnic delay 74 with a primer 76 positioned at the forward portion of the plug. A bore 78 in longitudinal alignment with the bore 68 in the plug 30 is located in the bulkhead 28. A firing pin 80 lies in the bore 78 and a spring 82 abutting against a threaded cap 84 in the end of the bore 78 urges the firing pin toward the primer 76.

A mechanical means is provided for holding the firing pin in a normal position where it is spaced from the primer 76. The holding means comprises a gear 86 located in slot 87 in the bulkhead 28 and rotatably mounted on a pin 88. The gear 86 is connected by a pinion 90 which in turn is connected to a clock spring 92 through a second gear 94. The clock spring 92 normally urges the gear 86 to rotate about the pin 88. Means are also provided for normally retaining the gear 86 in the position shown in FIGURE 3, wherein it holds the firing pin 80 away from the primer 76. This retaining means includes a passage 96 communicating with the slot 87 in which the gear 86 is mounted. A bore rider 98 having a shoulder 100 thereon rides in a bore 102 in the bulkhead and includes a stem 104 which is slidable in the passage 96. A snap ring 106 is positioned at the outer end of the bore 102 to retain the bore rider therein. The bore rider 98 has its inner end located between the teeth of the gear 86 to prevent the gear from rotating when the bore rider is in communication with the bore of a launching tube. It can be appreciated that when the projectile is launched from a launching device, spring 108 in the bore 102 will urge the bore rider outwardly, thus releasing the inner end of stem 104 from the gear 86. Thereafter, the clock spring 92 will rotate the gear 86 which has an opening 110 which, when the gear 86 is rotated by the spring 92 a sufficient distance, will come into registry with the bore 78, thus permitting the spring biased firing pin 80 to pass through the opening and detonate the primer 76. When the primer 76 is fired, the pyrotechnic delay 74 will burn and initiate the explosive charge 72 located in the reduced thickness portion 66 of the plug 30, thus causing the reduced thickness portion to fracture. The charge 70 will also be ignited, which in turn ignites the propellant grain 24.

The sleeve 67 has a plurality of perforations 114 therein and is connected at its rear end to the plug 30 by welding or any other suitable means. The forward portion of the sleeve is loosely fitted over the forward portion 116 of the plug. When the explosive charge 72 is fired, thus fracturing the reduced diameter portion 66 of the plug, the force of the charge will eject the rear portion of the plug 30 from the rocket chamber carrying with it the perforated sleeve 67 connected to the plug. As mentioned before, the sleeve serves the purpose of supporting the propellant grain in the area where the grain surrounds the reduced diameter portion 66 of the plug. Firing of the charge 72 also ignites the propellant grain ignition charge 70 which both ignites the propellant grain 24 by creating hot gases which pass through sleeve perforations 114 and assists in ejecting the plug 30 from the cavity 26 and out the discharge orifice of the rocket chamber.

As can be seen in FIGURE 3, the head 34 of the plug 30 is enlarged and flattened at 117 to provide a greater bearing surface against a flat recess 118 in the ring 18. This design is advantageous where the strength of the plug may be of such a value that the gases from the launcher propellant charge might cause the plug to fracture or otherwise be damaged in the area of the reduced diameter portion 66. Also, because of the enlarged flattened head 117, the gas pressure of the launcher propellant charge acting on the head will be of sufficient force to overcome the inertia forces acting on the plug in the rearward direction when the projectile is being launched. It can also be appreciated that the enlarged head 117 will prevent the plug from being thrust forward into the rocket chamber 12 when the projectile is launched. Obviously, the plugs employed in the other embodiments of the invention disclosed herein may be provided with an enlarged head portion 117, as in FIGURE 3.

Figure 4:
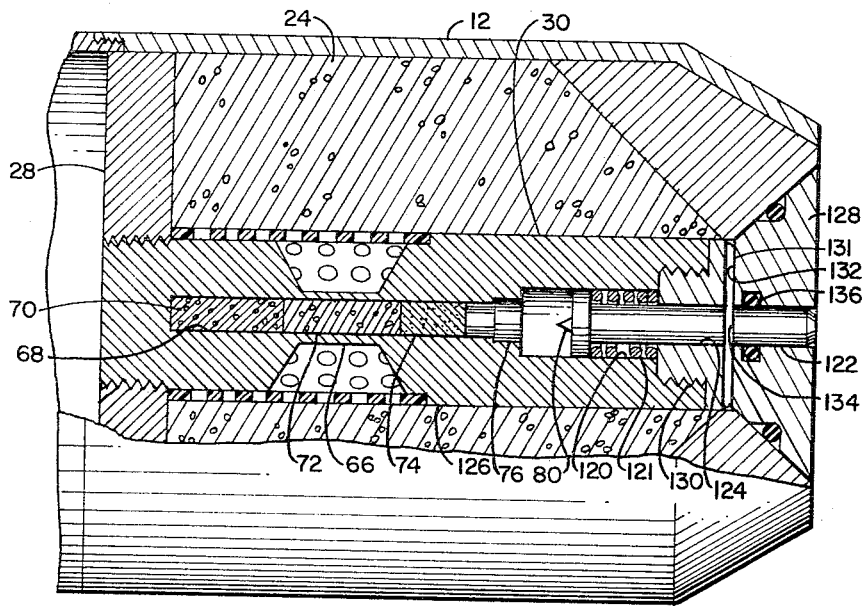
FIGURE 4 is a partial longitudinal section of the rear portion of an additional embodiment of the rocket projectile.

Referring now to FIGURE 4, wherein an additional embodiment of the invention is shown, a plug 30 is provided very similar to that shown in FIGURE 3. Corresponding elements in FIGURE 4 are designated by the same numerals used in FIGURE 3. The plug 30 has its forward portion directly screw-threaded into the bulkhead 28 of the rocket chamber 12. The longitudinal bore 68 in the plug containing the propellant grain ignition charge 70, the detonator or fracturing charge 72, the pyrotechnic delay 74, and primer 76 communicates with the larger diameter bore 120. The firing pin 80 in bore 120 is biased towards the primer 76 by spring 121. The firing pin has an extension 122 which extends through a bore 124 which opens through the end of the head 34 of the plug 30. It is seen that the plug 30 in this embodiment is made of two sections 126 and 128 screw-threaded together at 130 so that the firing pin 80 and spring 121 may be assembled in the plug 30. In this embodiment, the means for holding the firing pin 80 in its normal position away from the primer 76 is a shear pin 131 located in a transverse passage 132 in the rear portion 128 of the plug and which passes through an opening 134 in the extension 122 of the firing pin, thus retaining the pin from forward motion under the influence of the spring 121. A sealing ring 136 may also be provided around the extension 122 of the firing pin to prevent gases from the launcher propulsion charge from entering the propellant grain area of the rocket chamber.

When the projectile in FIGURE 4 is fired from a launching device, the launcher propellant charge forces the extension 122 of the firing pin 80 forward, thus breaking the shear pin 131. Forward movement of the firing pin 80 ignites the primer 76 which in turn ignites the pyrotechnic delay 74. The delay is of sufficient duration so that the detonator charge 72 will not be ignited until the projectile leaves the launcher tube. As explained hereinabove with respect to FIGURE 3, firing of the detonator charge 72 fractures the reduced diameter portion 66 of the plug 30 and causes the ejection of the rear portion of the plug 30 along with the perforated sleeve 67 from the rocket chamber 12, while also igniting the propellant grain ignition charge 70 located in the forward portion of the plug connected to the bulkhead 28. The charge 70 then will ignite the propellant grain 24 in the rocket chamber so that the projectile may continue its flight as a normal rocket motor.

Figure 5:
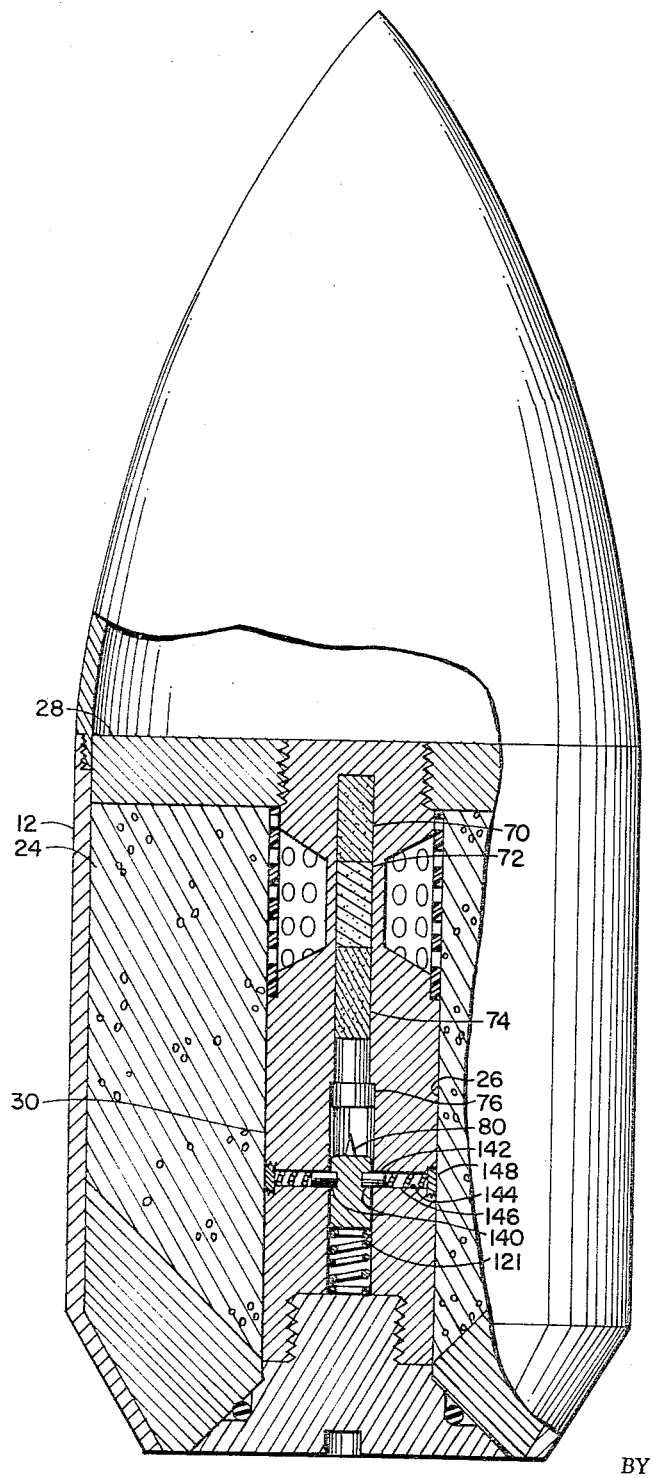
FIGURE 5 is a partial longitudinal section of still another embodiment of the rocket projectile.

The embodiment of the invention shown in FIGURE 5 differs only slightly from that in FIGURE 4 and in particular with reference to the means for holding the firing pin 80 from moving against the primer 76. In this embodiment, the firing pin is provided with a pair of opposite openings 140 which receive sliding detents 142 mounted in radical passages 144 in the plug 30. Springs 146 positioned radially outwardly from the detents 142 urge the detents into the openings 140 to hold the firing pin 80 in a normal position away from the primer 76. Threaded caps 148 positioned at the outer ends of the passages 144 retain the springs in the plug 30. When the projectile is fired from a rifle-type launching device, it will spin as a normal bullet would spin in a rifle bore, thus creating a centrifugal force to act on the detents 142. The projectile will spin at a sufficient rotational rate while being fired from the launcher to create a sufficient centrifugal force to cause the detents 142 to move outwardly and release from the openings 140 in the firing pin 80. Thereafter, the pin 80 moves forward under the influence of spring 121, thus firing the primer 76, pyrotechnic delay 74, detonator 72, and propellant grain ignition charge 70.

Figure 6:
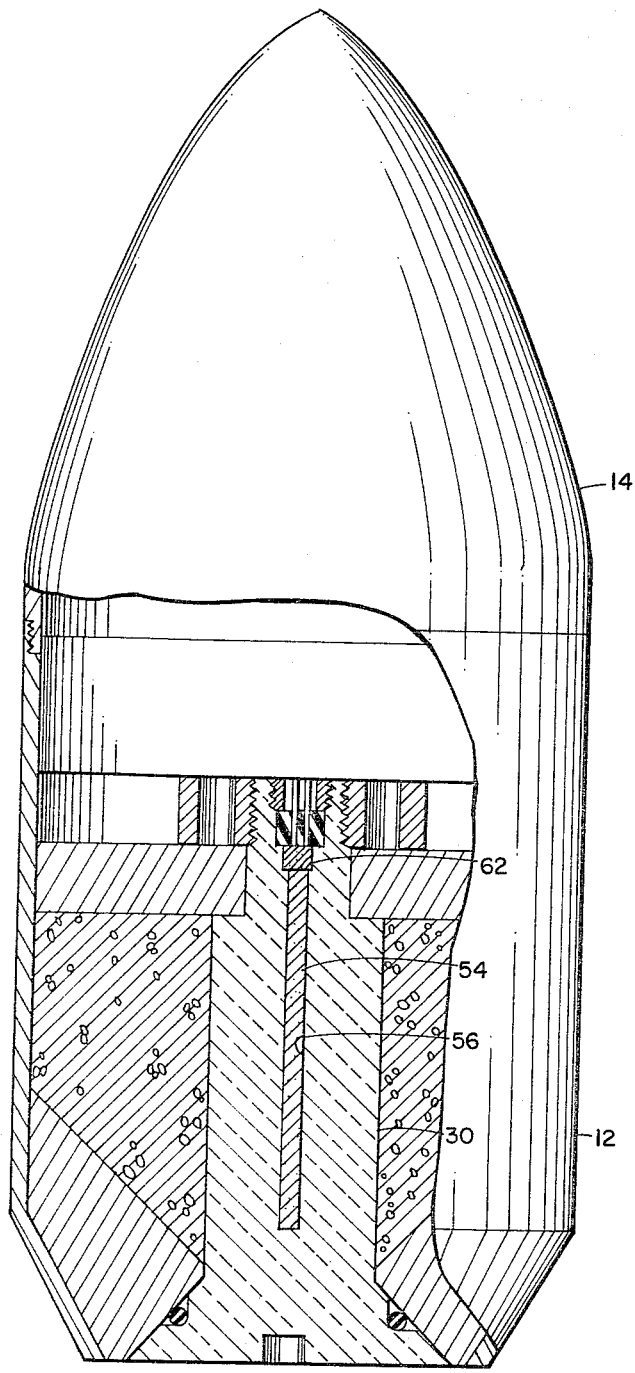
FIGURE 6 is a partial longitudinal section of a further embodiment of the rocket projectile.

The modification of the invention illustrated in FIGURE 6 is identical to the projectile illustrated in FIGURE 1 except for the material of plug 30 and the length of ignition charge employed. It is contemplated that the plug 30 of this embodiment may be formed of a frangible material, such as glass or brittle plastic. The bore 56 in the plug is narrower and longer than that shown in FIGURE 1 so that a longer ignition charge in the form of a mild detonating explosive may extend the greater length of the plug. By this arrangement, when the primer 62 is fired to cause ignition of charge 54 in the frangible plug, the gas pressure developed by the ignited charge will shatter the plug into small pieces and expel those pieces from the rear of the projectile.

Figure 7:
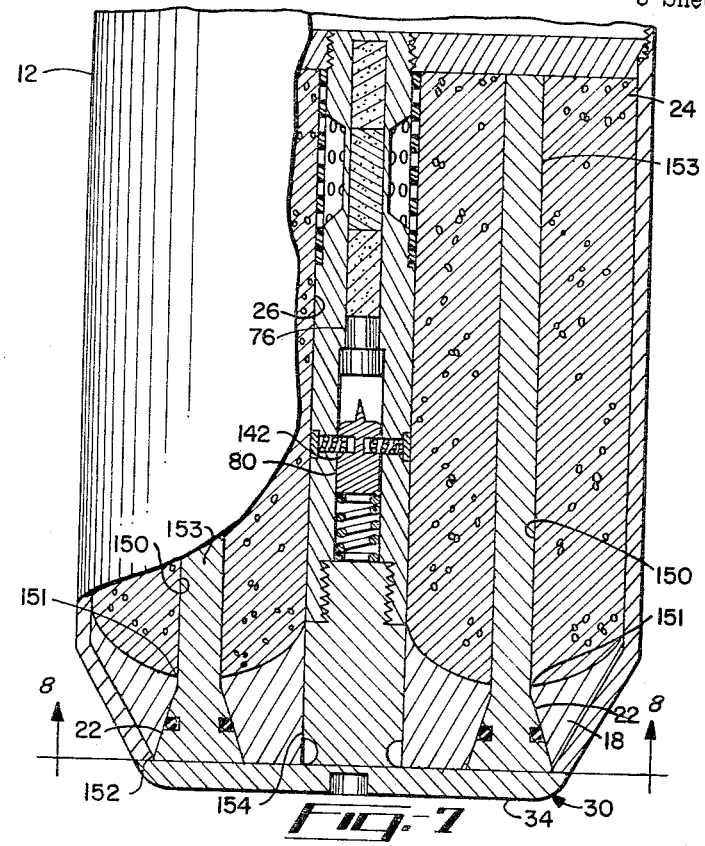
FIGURE 7 is a partial longitudinal section of the rear portion of an additional embodiment of the rocket projectile.
Figure 8:
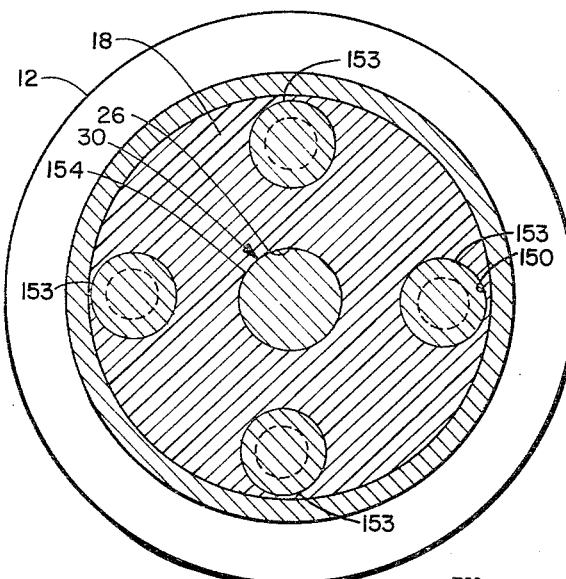
FIGURE 8 is a cross-section taken on line 8—8 of FIGURE 7.

FIGURES 7 and 8 show another embodiment of the invention wherein a propellant grain is employed having a plurality of cavities therein. The propellant grain 24 shown in FIGURES 7 and 8 is provided with four cavities 150 surrounding the central cavity 26, it being understood that any number of cavities could be provided. The ring 18 is shaped to provide four converging-diverging nozzle sections, each having a throat communicating with each of the cavities 150 and a discharge orifice 152. The plug 30 in this embodiment includes a head 34 which completely closes the rear opening of the rocket chamber 12 and includes four forwardly extending portions 152 which fill the cavities 150 and a central extension 154 which fills central cavity 26 in the propellant grain 24. The means for ejecting the plug 30 in this embodiment is shown as being associated only with the central extension 154 lying in the cavity 26 and operates in the same manner as the arrangement shown in FIGURE 5. In this embodiment, the five cavities in the propellant grain are all filled by the plug 30 and therefore are supported so that they will not be deformed or extruded from the projectile during high axial acceleration thereof. It can be appreciated that the entire plug 30 including extensions 153 and 154 will be ejected from the rear of the rocket chamber when the centrifugal detents 142 release the firing pin 80.

Although the embodiments of the invention disclosed herein show the plug 30 fastened to a forward motor bulkhead 28, it should be further appreciated that the plug may be retained in the cavity 26 of the propellant grain to portions of the rocket motor other than the bulkhead 28 as, for example, to the ring 18 or to the rear portion of the rocket chamber 12 itself. Also, although the plug of the present invention has been described as being associated with a rocket having a converging-diverging type nozzle, it is to be understood that it could be employed in rockets having other nozzle designs, such as a plug-type nozzle which is well-known in the rocket art.

It will also be understood that various other changes can be made in the form, details, arrangement, and proportions of the various parts without departing from the spirit and scope of the invention as defined by the following claims.

I claim:

1. A rocket projectile adapted to be launched by a suitable launching device comprising: a rocket chamber having a nozzle section with a throat and a discharge orifice, propellant grain in said rocket chamber having a cavity therein, a bulkhead in said rocket chamber forward of said propellant grain, said bulkhead comprising a partition wall having its outer periphery in engagement with the internal surface of said rocket chamber, a plug filling said cavity and connected at its forward end to said bulkhead, means for separating the major portion of said plug from said bulkhead, and means for ejecting said major portion of said plug through said discharge orifice after launching of the rocket projectile from a launching device.

2. A rocket projectile as set forth in claim 1, wherein said ejecting means includes an explosive charge and said plug is formed of a frangible material.

3. A rocket projectile as set forth in claim 1 wherein said nozzle section has a converging-diverging configuration and said plug has an enlarged head thereon closing the diverging portion of said nozzle section.

4. A rocket projectile adapted to be launched by a suitable launching device comprising: a rocket chamber having a nozzle section with a throat and a discharge orifice, propellant grain in said rocket chamber having a cavity therein, a plug filling said cavity, said plug having a reduced thickness portion, means for fracturing said reduced thickness portion comprising an explosive charge in said reduced thickness portion, and means for igniting said explosive charge to fracture said reduced thickness portion after launching of the rocket projectile from a launching device, said explosive charge when ignited acting to eject the rear portion of said plug through said discharge orifice.

5. A rocket projectile as set forth in claim 4 wherein said plug includes a perforated sleeve surrounding said reduced thickness portion.

6. A rocket projectile as set forth in claim 4 wherein said means for igniting said explosive charge includes a primer adjacent to said explosive charge, a firing pin, means biasing said firing pin toward said primer, and means for holding said firing pin away from said primer until launching of said rocket projectile from a launching device.

7. A rocket projectile as set forth in claim 6 wherein said holding means comprise a centrifugal detent engaging said firing pin.

8. A rocket projectile as set forth in claim 6 wherein said holding means includes a shear pin engaging said firing pin, said firing pin having its rear portion extending through the rear of said plug whereby gases developed in a launching device will force said firing pin toward said primer thereby breaking said shear pin.

9. A rocket projectile as set forth in claim 6 wherein said holding means includes a member, in its normal position, having a portion thereof lying between said firing pin and said primer, said member having an opening therein through which said firing pin may pass when in registry therewith, means urging said member to a position in which said opening is in registry with said firing pin, and means retaining said member in its normal position until said rocket projectile is launched from a launching device.

10. A rocket projectile as set forth in claim 6, and in addition, a pyrotechnic delay between said primer and said explosive charge.

11. A rocket projectile adapted to be launched by a suitable launching device comprising: a rocket chamber having a nozzle section with a throat and a discharge orifice, propellant grain in said rocket chamber having a cavity therein, a bulkhead in said rocket chamber forward of said propellant grain; a plug filling said cavity, fracturable connecting means connecting the forward end of said plug to said bulkhead, means for fracturing said connecting means and means for ejecting said plug through said discharge orifice after launching of the rocket projectile from a launching device.

12. A rocket projectile as set forth in claim 11 wherein said fracturable connecting means is an explosive nut.

13. A rocket projectile as set forth in claim 11 wherein said ejecting means is an explosive charge in the forward portion of said plug, said ejecting means also serving to ignite said propellant grain.

14. A rocket projectile adapted to be launched by a suitable launching device comprising: a rocket chamber, propellant grain in said rocket having a plurality of longitudinal cavities therein, said rocket chamber having a plurality of converging-diverging nozzle sections associated with said cavities, means associated with said cavities and the diverging portion of said nozzle section for supporting said propellant grain and closing said diverging portion of said nozzle section, and means for ejecting said supporting and closing means through the rear of said rocket chamber after launching of the rocket projectile from a launching device.

15. A rocket projectile adapted to be launched by a suitable launching device comprising: a rocket chamber having a nozzle section with a throat and a discharge orifice, propellant grain in said rocket chamber having a cavity therein, a bulkhead in said rocket chamber forward of said propellant grain, said bulkhead comprising a partition wall having its outer periphery in engagement with the internal surface of said rocket chamber, a plug filling said cavity and connected at its forward end to said bulkhead, said plug having a reduced thickness portion, means for fracturing said reduced thickness portion comprising an explosive charge in said reduced thickness portion, and means for igniting said explosive charge to fracture said reduced thickness portion after launching of the rocket projectile from a launching device, said explosive charge when ignited acting to eject the rear portion of said plug through said discharge orifice.

References Cited by the Examiner
UNITED STATES PATENTS

| | | | |
|---|---|---|---|
| 2,773,448 | 12/1956 | Jasse | 102—49 |
| 2,989,922 | 6/1961 | Greenwood et al. | 102—49 |
| 3,104,523 | 9/1963 | O'Donnell | 60—35.6 |
| 3,119,303 | 1/1964 | Jasse | 102—49 X |
| 3,121,993 | 2/1964 | Pennington | 60—35.6 |

BENJAMIN A. BORCHELT, *Primary Examiner.*

ARTHUR M. HORTON, SAMUEL FEINBERG,
*Examiners.*

V. R. PENDEGRASS, *Assistant Examiner.*